United States Patent [19]

Neri et al.

[11] Patent Number: 4,985,481

[45] Date of Patent: Jan. 15, 1991

[54] SOLID STABILIZER COMPOSITION FOR SYNTHETIC POLYMERS

[75] Inventors: Carlo Neri, San Donato Milanese; Nereo Nodari, Spino d'Adda; Giovanni Sandre, San Donato Milanese, all of Italy

[73] Assignee: ENICHEM Synthesis, S.p.A., Palermo, Italy

[21] Appl. No.: 409,271

[22] Filed: Sep. 19, 1989

Related U.S. Application Data

[63] Continuation of Ser. No. 158,388, Feb. 22, 1988, abandoned.

[30] Foreign Application Priority Data

Mar. 3, 1987 [IT] Italy .................. 19550 A/87

[51] Int. Cl.$^5$ ............. C08K 5/524; C08K 5/526; C09K 15/32
[52] U.S. Cl. ..................... 524/120; 524/126; 524/147; 524/151; 524/222; 252/400.24; 252/403
[58] Field of Search ............. 252/400.24, 403; 524/120, 126, 147, 151, 222; 528/483, 499, 503, 502

[56] References Cited

U.S. PATENT DOCUMENTS 4,766,200 8/1988 Riazi ..................... 528/502
4,777,192 10/1988 Neuberg et al. ........ 528/499

FOREIGN PATENT DOCUMENTS 48401 1/1984 Canada .................. 252/400.24
803557 10/1958 United Kingdom .

Primary Examiner—Kriellion Morgan
Attorney, Agent, or Firm—Hedman, Gibson, Costigan & Hoare

[57] ABSTRACT

A solid stabilizer composition for synthetic polymers is formed by a solid, continuous phase and by a solid dispersed phase in said continuous phase, wherein the continuous phase is constituted by amorphous 2,2'-oxamido-bis[ethyl-3-(3,5-di-tert.-butyl-4-hydroxyphenyl)-propionate] and the dispersed phase is constituted by an amorphous, or crystalline, or partially amorphous and partially crystalline organic phosphite, with the weight ratio of said continuous phase to said dispersed phase being comprised within the range of from 9:1 to 1:9.

The process for preparing said solid composition and its use in the stabilization of synthetic polymers are disclosed.

14 Claims, No Drawings

SOLID STABILIZER COMPOSITION FOR SYNTHETIC POLYMERS

This application is a continuation of application Ser. No. 07/158,388, filed Feb. 22, 1988 now abandoned.

The present invention relates to a solid composition stabilizer for synthetic polymers, to the processes for preparing it and to its use in the stabilization of the synthetic polymers.

In the art, it is usual to stabilize the synthetic polymers against the oxidative degradation caused by light and heat, by means of the addition of small amounts of stabilizers, such as the sterically hindered phenols, and the organic phosphites, sometimes used in combination with one another. For such a technique known from the prior art, reference is made to the specification of U.K. Pat. No. 803,557, U.S. Pat. No. 3,516,963, U.S. Pat. No. 4,187,212, U.S. Pat. No. 4,360,617 and European patent No. 48,562.

A drawback relevant to some organic phosphites is their tendency to hydrolyze, in particular during their storage under warm and moist conditions, with the consequent loss of stabilizing activity, and danger of corrosion of the equipment used for processing the organic polymers incorporating said hydrolysed phosphites.

Therefore, it is usual in the art to stabilize the organic phosphites by means of the addition of organic bases which act by buffering the acidity which is formed during the hydrolyze, and therefore slow down the hydrolyze rate.

However, this operating way does not make it possible satisfactory results to be achieved, in particular in case of the organic phosphites derived from pentaerythritol, whose sensitivity to hydrolyze remains high even in the presence of an organic base.

On the other side, in the use of mixtures of sterically hindered phenols and of organic phosphites in the stabilization of the organic polymers, difficulties exist in accomplishing a complete mutual homogenizing of the two stabilizers, and then of these with the organic polymer. Often, this fact, combined with the phenomena of hydrolyze the phosphite can undergo, does not allow a so high as desirable stabilizing effect to be obtained.

A sterically hindered phenol used in the art in order to stabilize the synthetic polymers is 2,2'-oxamido-bis-[ethyl-3-(3.5-di-tert.-butyl-4-hydroxyphenyl)propionate]:

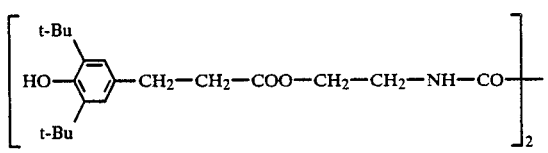

disclosed, e.g., in European patent application publ. No. 21,596 and in U.S. Pat. No. 4,145,556 and U.S. Pat. No. 4,263,446.

The present Applicant found now that when said 2,2'-oxamido-bis[ethyl-3-(3.5-di-tert.-butyl-4-hydroxyphenyl)propionate] is molten and then rapidly cooled down to ambient temperature values, takes a solid and amorphous form, and is capable of stably maintaining such an amorphous state when it is maintained at temperatures lower than approximately 50° C.

The present Applicant found also that when a liquid and homogeneous mixture of said 2,2'-oxamido-bis[ethyl-3-(3,5-di-tert.-butyl-4-hydroxyphenyl)-propionate] with an organic phosphite, solid at ambient temperature, is rapidly cooled, a solid composition can be obtained in which such 2,2'-oxamido-bis [ethyl-3-(3,5-di-tert.-butyl-4-hydroxyphenyl)-propionate] constitutes the solid, continuous and amorphous phase, and the organic phosphite constitutes the solid, amorphous and/or crystalline phase dispersed in said continuous phase, and that such a composition is capable of stably maintaining said characteristics within the above specified range of temperatures.

The present Applicant found finally that the organic phosphite, in said composition, acquires exceptionally high characteristics of resistance to hydrolyze, and that the same composition constitutes a stabilizer which is easily homogenizable with the synthetic polymers, and is capable of endowing the same polymers with excellent characteristics of stability to the action of degradation caused by light and heat.

In accordance with the above, a purpose of the present invention is a solid composition resistant to hydrolyze, stabilizer for the organic polymers.

Another purpose of the present invention is the process for preparing such a composition.

A further purpose of the present invention is the use of the composition in the stabilization of the synthetic polymers.

Still further purposes of the invention will be clear for those skilled in the art from the following disclosure.

In particular, the solid composition, resistant to hydrolyze and stabilizer for synthetic polymers, according to the present invention, is formed by a solid continuous phase and a solid phase dispersed in said continuous phase, wherein the continuous phase is constituted by amorphous 2,2'-oxamido-bis[ethyl-3-(3,5-di-tert.-butyl-4-hydroxyphenyl)-propionate], and the dispersed phase is constituted by an either amorphous, or crystalline, or partially amorphous and partially crystalline organic phosphite, with said organic phosphite being solid at ambient temperature, and being selected from those definable by the following general formulae:

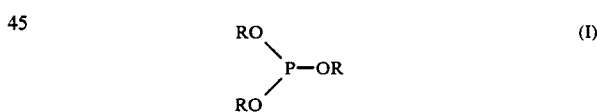

and

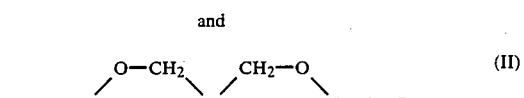

and

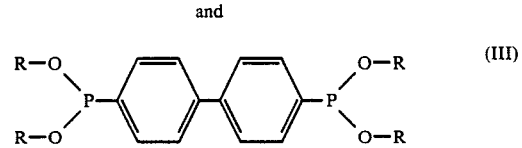

wherein: the R radicals independently represent either substituted or non-substituted alkyl, cycloalkyl, aryl, alkaryl or aralkyl radicals;

the weight ratio of said continuous phase to said dispersed phase, in said composition, being furthermore comprised within the range of from 9:1 to 1:9.

The sterically hindered phenol, 2,2'-oxamido-bis[ethyl-3-(3,5-di-tert.-butyl-4-hydroxyphenyl)-propionate], is normally available as a crystalline solid having a melting point of 175°–178° C. When this phenol is heated to a temperature higher than its melting temperature, and is then rapidly cooled to ambient temperature values (20° C.), or to temperature values approximately equal to ambient temperature, turns into a solid amorphous on X-ray analysis, with the following characteristics, detected by DSC (Differential Thermal Analysis):

a glass transition at approximately 40° C.;
an exothermic peak at approximately 131° C., relevant to crystallization of a portion of the product.
an endothermic peak at approximately 176° C., relevant to the melting of the crystallized portion of the product.

Examples of organic phosphites falling within the scope of above formula (I), useful for the purposes of the present invention are: diphenyl 2-ethylhexylphosphite, triphenyl phosphite, tris(2,5-di-tert.-butylphenyl)-phosphite, tris(2-tert.-butylphenyl)-phosphite, tris-(2-phenylphenyl)-phosphite, tris[2-(1,1-dimethylpropyl)phenyl]phosphite, tris(2-cyclohexylphenyl)-phosphite, tris(2-tert.-butyl-4-phenylphenyl)-phosphite, tris(2-tert.-butyl-4-methylphenyl)-phosphite, tris(2,4-di-tert.-amylphenyl)-phosphite and tris(2,4-di-tert.-butylphenyl)phosphite.

Examples of organic phosphites falling within the scope of above formula (II), useful for the purposes of the present invention are: bis(2,4-di-tert.-butylphenyl)-pentaerythritol diphosphite and distearyl-pentaerythritol diphosphite.

An example of organic phosphite, or, more properly, phosphonite, falling within the scope of formula (III), is tetrakis(2,4-di-tert.-butylphenyl)-4,4'-biphenylene diphosphonite.

In the preferred form of practical embodiment, the organic phosphite is present in the composition in the form of particles having a particle size of the order of from 50 to 500 μm, and the weight ratio of the continuous phase to the dispersed phase in the composition is comprised within the range of from 3:7 to 7:3.

The composition of the present invention is prepared by blending 2,2'-oxamido-bis[ethyl-3-(3,5-di-tert.-butyl-4-hydroxyphenyl)propionate] powder with the selected organic phosphite powder.

By operating under nitrogen, or under another inert gas, the mass is molten to a temperature which typically is of the order of from 180° to 200° C., the molten mass is homogenized and is then submitted to a rapid cooling down to ambient temperature values (20°–25° C.), or to temperature values close to ambient temperature.

The rapid cooling, suitable for causing the molten material to rapidly solidify, can be carried out by any methods known in the art. The preferred methods consist in pouring the molten material on a cool metal plate, maintained, e.g., at a temperature equal to, or lower than, ambient temperature; in pouring the molten mass into water, or another non-reactive, cold liquid, e.g., maintained at a temperature equal to, or lower than, ambient temperature; and in cooling the molten, or partially molten, material in an inert gas (e.g., nitrogen), in the form of droplets, by means of a technique similar to prilling.

In any case, a stabilizer composition resistant to hydrolyze is obtained, wherein the organic phosphite is in the form of a solid phase, as particles having a particle size comprised within such range of values as above specified, with said particles being dispersed inside a continuous and amorphous solid phase of 2,2'-oxamido-bis[ethyl-3(3,5-di-tert.-butyl-4-hydroxyphenyl)propionate].

The phosphite, in said composition, will be in the form of an amorphous, or crystalline, or partially amorphous and partially crystalline solid, as a function of the characteristics of the particular phosphite selected and, above all, as a function of the concentration of phosphite in the composition, in the meaning that at the higher concentrations of the same phosphite, the crystalline form is favoured.

Furthermore, the process for the preparation of the above disclosed composition makes it possible a solid composition to be prepared as a mass which can be submitted to scaling and/or to grinding, or as free-flowing granules, having the desired particle size, which can be directly used in the stabilization of the synthetic polymers.

By means of the composition of the present invention, synthetic polymers and copolymers can be stabilized, such as polyolefins, EPDM resins, elastomers, ABS resins, polymeric alloys, polyesters, polycarbonates, and still others. The particularly good results which can be obtained by means of the composition of the present invention probably derive from the absence, or the substantial absence, of phenomena of hydrolyze of the phosphite, and from the optimum distribution of the two components of the same composition, which facilitates a good homogenizing and distribution inside the synthetic polymer.

The following experimental examples are illustrative and non-limitative of the scope of the present invention.

EXAMPLE 1

In this example, compositions formed by the
(A) component: 2,2'-oxamido-bis[ethyl-3-(3,5-di-tert.-butyl-4-hydroxyphenyl)-propionate];
and by the
(B) component: bis(2,4-di-tert.-butylphenyl)pentaerythritol diphosphite
are prepared and characterized.

In particular, compositions containing the (A) and (B) components in various proportions, are prepared.

The process used for preparing the compositions is as follows.

To a glass reactor having a capacity of 0.5 liters, equipped with a mechanical stirrer, and with a jacket for heating fluid circulation, (A) and (B) component powders are charged under nitrogen, according to the above specified weight ratios. The powders are molten by heating to 190° C.; the molten mass is maintained at this temperature for a few minutes, in order to homogenize it, and this latter is then poured onto an aluminum plate of 50×50 cm, maintained at ambient temperature. On the plate a this transparent layer is formed, which solidifies soon into a glass-like mass. When all the solid has reached ambient temperature, the solid is ground inside a mortar with a pestle, until a powder is obtained, whose average particle size is of approximately 10 to 500 microns.

The so-obtained compositions are submitted to the following analytical checks:

HPLC (High Pressure Liquid Chromatography) analysis: the sample, dissolved in acetone and analysed by high pressure liquid chromatography, shows the presence of the two components in their respective starting amounts, and does not show any presence of foreign substances as compared to the initial substances;

DSC (Differential Scanning Calorimetry) analysis: the sample is sealed inside an aluminum dish, and the dish is charged to the sample-holder of the instrument (Mettler TA 3000, with Mettler TC 10 Processor), and is heated under nitrogen, at a temperature increase rate of 15 degrees Celsius/minute, up to 200° C. The behaviour of the sample shows the presence of a continuous amorphous phase of the (A) component, and of the dispersed phase of the (B) component.

The stability to hydrolyze of the phosphite in said compositions is measured by storing the samples inside a sealed chamber, under controlled conditions of temperature and moisture. Samples are drawn over time, and the drawn samples are submitted to HPLC analyses, which make it possible the presence of unaltered (A) and (B) components, and the presence of the 2,4-di-tert.-butylphenol possibly formed due to the hydrolytic decomposition, to be determined. This test makes it possible to conclude for the high stability to hydrolyze of the compositions.

EXAMPLE 2

The experimental procedure is the same as of Example 1, with compositions being prepared, which are formed by the (A) phenolic component, and by the (C) component: tris-(2,4-di-tert.-butylphenyl) phosphite, in various proportions.

The so obtained compositions were submitted to HPLC and DSC analyses, as reported in Example 1, with results similar to those as obtained in said Example 1 being obtained.

The action of the stabilizer compositions according to the present invention is verified, during the processing step, both by means of measurements of Melt-Flow Index (MFI—ASTM D 1238) after a plurality of extrusions of a polymeric composition constituted by an organic polymer and a stabilizer composition, and by means of measurements of Yellow Index carried out on slabs of 1.5 mm of thickness, obtained by press-moulding the granules corresponding to the various extrusions.

Furthermore on the slabs, relating to the first-extrusion granules, the long-term stability is determined by thermal aging inside a forced-air circulation oven at 140° C., until the first degradations symptoms appear at the edges of the sample.

Commercial polypropylene marketed by Montedison company under the trade-name MOPLEN ® FL 20F is blended with the stabilizer compositions containing the (A) phenolic antioxidant, and the (B) phosphite, with various ratios of (A)/(B) in the stabilizer composition. In all cases, the amount of stabilizer composition is fixed at the value of 0.1% by weight. In particular, stabilizer compositions are used, which contain the (A) and (B) components in the following proportions, as % by weight: 80%A–20%B; 60%A–40%B; 50%A–50%B; 40%A–60%B; 20%A–80%B. For comparative purposes, also the (A) and (B) stabilizers are separately used in an amount of 0.1% by weight in the composition with the polymer.

The blending of the polymer with the stabilizer compositions, or the individual stabilizers, is carried out by a 30-minute blending inside a planetary mixer.

The so obtained homogeneous powders are extruded, for 7 successive passages, through an extruder of 19 mm of diameter, with a barrel length approximately 5 times as long as the barrel diameter, equipped with a screw and with a nozzle of 2 mm, with a compression ratio of 1:4, at the speed of 50 revolutions per minute, and with a temperature profile along the extruder of 190° C.; 235° C.; 270° C.; 270° C.

After each extrusion, the filament is chopped into granules. A portion of the so-obtained granules are analysed for Melt Index according to ASTM-D 1238, by operating at 230° C., and under a pressure of 2.16 kg.

A second portion of the granules are used for preparing slabs. The balance are used for the successive extrusions.

The results obtained as to the change in Melt Index, after the 1st, 3rd, 5th and 7th extrusion, are summarized in Table 1.

In said table, also the values are reported, which are obtained with virgin polypropylene.

The granules put aside after each extrusion are press-moulded so as to obtain slabs of 1.5 mm of thickness, by operating at 200° C., for 3 minutes under 4 kg/cm$^2$, and for the following 3 minutes under 130 kg/cm$^2$, and subsequently cooling the so obtained slabs in water at ambient temperature.

On these slabs, measurements of Yellow Index are carried out by a reflection method.

The results of these tests are reported in Table 2, relatively to the slabs corresponding to the granules obtained after the odd-numbered extrusions.

Finally, for all samples, the slabs obtained after the first extrusion are submitted to an accelerated thermal aging, at 140° C., inside a forced-air circulation oven, equipped with a rotary carousel as the sample-holder. The stability over time is verified until symptoms of degradation at slab edges first appear.

In Table 3, the observed degradation induction times are reported.

The same commercial polypropylene MOPLEN ® FL 20F was used for preparing commercial samples containing 0.1% by weight of the stabilizer composition formed by the (A) phenolic stabilizer and by the (C) phosphite in various proportions. On these samples, tests are carried out, which are at all similar to the above described tests, and the results are reported in Tables 4, 5 and 6, which respectively contain the values of change in polymer Melt Index measured after multiple extrusions; the values of the Yellow Indexes of the slabs obtained from the granules produced in the various extrusions; and the induction times at the incipient degradation symptoms, relevant to the slabs obtained from the granules from the first extrusion and submitted to accelerated aging.

TABLE 1

Change in Melt-Flow Index of Polypropylene Containing the Stabilizer, Composition Constituted by (A) and (B) Compounds, with Various Ratios of the Two Components, as a Function of the Number of Successive Passages Through the Extruder

| Stabilizer Composition | Ratio | Number of Extrusions | | | |
|---|---|---|---|---|---|
| | | 1 | 3 | 5 | 7 |
| None (Comparison) | — | 18.45 | 27.35 | 42.95 | 53.26 |
| A Component (Comparison) | — | 15.45 | 20.23 | 25.28 | 31.83 |
| A Component/B Component | 8:2 | 12.90 | 16.11 | 19.25 | 22.70 |
| A Component/B Component | 6:4 | 12.99 | 15.07 | 16.82 | 18.80 |
| A Component/B Component | 5:5 | 12.29 | 14.14 | 16.11 | 18.12 |
| A Component/B Component | 4:6 | 11.84 | 13.77 | 15.45 | 17.91 |
| A Component/B Component | 2:8 | 11.96 | 13.55 | 15.36 | 17.00 |

TABLE 1 (continued)

| Stabilizer Composition | Ratio | Number of Extrusions | | | |
|---|---|---|---|---|---|
| | | 1 | 3 | 5 | 7 |
| B Component (Comparison) | — | 12.48 | 14.17 | 15.67 | 17.76 |

TABLE 2

Change In Yellow Index of Slabs of Stabilized Polypropylene With Different Ratios of (A) and (B) Compounds in the Stabilizer Composition, as a Function of the Number of Successive Passages Through the Extruder

| Stabilizer Composition | Ratio | Number of Extrusions | | | |
|---|---|---|---|---|---|
| | | 1 | 3 | 5 | 7 |
| None (Comparison) | — | 3.15 | 6.18 | 8.21 | — |
| A Component (Comparison) | — | 2.53 | 3.79 | 4.80 | 6.22 |
| A Component/B Component | 8:2 | 2.17 | 2.64 | 2.90 | 3.52 |
| A Component/B Component | 6:4 | 1.94 | 2.39 | 2.41 | 2.71 |
| A Component/B Component | 5:5 | 1.89 | 2.15 | 2.47 | 2.69 |
| A Component/B Component | 4:6 | 1.82 | 2.12 | 2.26 | 2.45 |
| A Component/B Component | 2:8 | 1.64 | 1.91 | 2.05 | 2.37 |
| B Component (Comparison) | — | 1.74 | 1.92 | 2.11 | 2.44 |

TABLE 3

Induction Times Until the Appearance of the First Symptoms of Degradation of Polypropylene Slabs Aged at 140° C., Stabilized with Different Ratios of (A) and (B) Compounds in the Stabilizer Composition

| Stabilizer Composition | Ratio | Induction Time (Hours) |
|---|---|---|
| None (Comparison) | — | 24 |
| A Component (Comparison) | — | 637 |
| A Component/B Component | 8:2 | 586 |
| A Component/B Component | 6:4 | 553 |
| A Component/B Component | 5:5 | 512 |
| A Component/B Component | 4:6 | 435 |
| A Component/B Component | 2:8 | 302 |
| B Component (Comparison) | — | 121 |

TABLE 4

Change in Melt-Flow Index of Polypropylene Containing the Stabilizer Composition Constituted by (A) and (C) Compounds, at Various Ratios of the Two Components, as a Function of the Number of Successive Passages Through the Extruder

| Stabilizer Composition | Ratio | Number of Extrusions | | | |
|---|---|---|---|---|---|
| | | 1 | 3 | 5 | 7 |
| None (Comparison) | — | 18.45 | 27.35 | 42.95 | 53.26 |
| A Component (Comparison) | — | 15.45 | 20.23 | 25.28 | 31.83 |
| A Component/C Component | 8:2 | 15.03 | 18.96 | 23.66 | 28.32 |
| A Component/C Component | 6:4 | 14.36 | 18.01 | 22.04 | 24.86 |
| A Component/C Component | 5:5 | 14.12 | 17.32 | 20.56 | 23.55 |
| A Component/C Component | 4:6 | 13.73 | 16.64 | 19.73 | 22.46 |
| A Component/C Component | 2:8 | 13.70 | 16.00 | 18.70 | 21.60 |
| C Component (Comparison) | — | 13.75 | 16.31 | 20.59 | 26.63 |

TABLE 5

Change in Yellow Index of Slabs of Stabilized Polypropylene with Different Ratios of (A) and (C) Compounds in the Stabilizer Composition, as a Function of the Number of Successive Passages Through the Extruder

| Stabilizer Composition | Ratio | Number of Extrusions | | | |
|---|---|---|---|---|---|
| | | 1 | 3 | 5 | 7 |
| None (Comparison) | — | 3.15 | 6.18 | 8.21 | — |
| A Component (Comparison) | — | 2.53 | 3.79 | 4.80 | 6.22 |
| A Component/C Component | 8:2 | 2.65 | 4.03 | 5.22 | 7.39 |
| A Component/C Component | 6:4 | 2.67 | 4.29 | 5.94 | 8.31 |
| A Component/C Component | 5:5 | 2.75 | 4.46 | 6.37 | 8.59 |
| A Component/C Component | 4:6 | 2.88 | 4.36 | 6.24 | 8.73 |
| A Component/C Component | 2:8 | 2.92 | 4.79 | 6.30 | 8.13 |
| C Component (Comparison) | — | 3.55 | 5.39 | 6.49 | 7.45 |

TABLE 6

Induction Times Until the Appearance of the First Symptoms of Degradation of Polypropylene Slabs Aged at 140° C., Stabilized with Different Ratios of (A) and (C) Compound in the Stabilizer Composition

| Stabilizer Composition | Ratio | Induction Time (Hours) |
|---|---|---|
| None (Comparison) | — | 24 |
| A Component (Comparison) | — | 637 |
| A Component/C Component | 8:2 | 541 |
| A Component/C Component | 6:4 | 453 |
| A Component/C Component | 5:5 | 362 |
| A Component/C Component | 4:6 | 241 |
| A Component/C Component | 2:8 | 115 |
| C Component (Comparison) | — | 74 |

We claim:

1. A process for preparing a solid composition, resistant to hydrolyze and useful as a stabilizer in synthetic polymers, comprising the following steps taken before admixture of the composition with the polymers: (a) blending 2,2'-oxamido-bis(ethyl-3-(3,5-ditert.-butyl-4-hydroxyphenyl)-propionate) with organic phosphite, said organic phosphite, said organic phosphite being selected from the group consisting of compounds having the formulas:

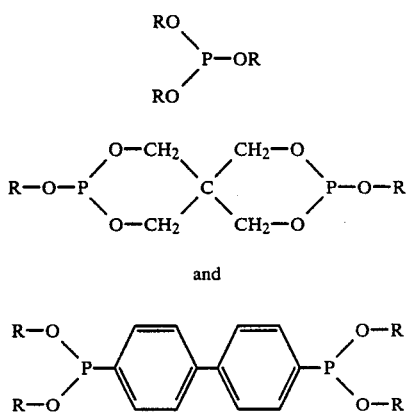

wherein R may be the same or different and is selected from alkyl, cycloalkyl, aryl, alkaryl or aralkyl radicals unsubstituted or substituted with alkyl, cycloalkyl, aryl, alkaryl or aralkyl radicals: (b) heating said blend of step (a) to a molten mass; and (c) rapidly cooling said molted mass to about room temperature, to thereby form a composition comprising a solid continuous phase and a solid phase dispersed in said continuous phase, wherein the continuous phase is constituted by said 2,2'-oxamido-bis(ethyl-3-(3,5-di-tert.-butyl- 4-hydroxyphenyl)-propionate) in amorphous form and the dispersed phase is constituted by said organic phosphite in amorphous, or crystalline, or partially amorphous and partially crystalline form, and wherein the weight ratio of said continuous phase to said dispersed phase is from 9:1 to 1:9.

2. The process according to claim 1, further comprising homogenizing said molten mass before step (c).

3. The process according to claim 1, wherein the organic phosphite of formula (I) is selected from the group consisting of:
diphenyl 2-ethylhexyl phosphite, triphenyl phosphite, tris(2,5-di-tert.-butyl-phenyl)-phosphite, tris (2-phenylpheyny)-phosphite, tris(2-tert.-butylphenyl)-phosphite, tris[2-(1,1-dimethylpropyl)-phenyl]-phosphite, tris(2-cyclohexylphenyl)-phosphite, tris(2-tert.butyl-4-phenylphenyl)-phosphite, tris(2-tert.-butyl-4-methylphenyl)-phosphite, tris(2,4-di-tert.amylphenyl)-phosphite and tris(2,4-di-tert.-butylphenyl)-phosphite.

4. The process according to claim 1, wherein the organic phosphite of formula (II) is selected from the group consisting of: bis(2,4-di-tert.-butylphenyl)pentaerythritol diphosphate and distearyl-pentaerythritol diphosphite.

5. The process according to claim 1, wherein the organic phosphite of formula (III) is: tetrakis(2,4-di-tert.-butylphenyl)-4,4'-biphenylene diphosphonite.

6. The process according to claim 1, wherein the weight ratio of said continuous phase to said dispersed phase is from 3:7 to 7:3.

7. The process according to claim 1, wherein the size of the particles of said dispersed phase is from 50 to 500 μm.

8. The process according to claim 1, wherein the step (b), said blend is heated to about 180°-200° C.

9. The process according to claim 1, wherein step (c) comprises pouring said molten mass onto a cold metal plate.

10. The process according to claim 1, wherein step (c) comprises contacting said molten mass with a cold, non-reactive liquid.

11. The process according to claim 10, wherein said liquid is water.

12. The process according to claim 1, wherein step (c) comprises contacting said molten mass with an inert gas.

13. The process according to claim 12, wherein said inert gas is nitrogen.

14. A process for preparing a solid composition, resistant to hydrolyze and useful as a stabilizer in synthetic polymers, comprising:
(a) blending 2,2'-oxamido-bis(ethyl-3-(3,5-di-tert.-butyl-hydroyphenyl)-propionate) with organic phosphite, said organic phosphite being selected from the group consisting of: diphenyl 2-ethylhexyl phosphite, triphenyl phosphite, tris(2,5-di-tert.-butyl-phenyl)-phosphite, tris(2-tert.-butylphenyl)-phosphite, tris(2-phenylphenyl)-phosphite, tris(2-(1,1-dimethylpropyl)phenyl)-phosphite, tris-(2-cyclohexylphenyl)-phosphite, tris(2-tert.butyl-4-phenylphenyl)-phosphite, tris(2-tert.-butyl-4-methyl-yl-phenyl)-phosphite, tris(2,4-di-tert.-amylphenyl)-phosphite, tris (2,4-di-tert.-butylphenyl)-phosphite, bis(2,4-di-tert.-butylphenyl)pentaerythritol diphosphite, distearyl-pentaerythritol diphosphite, and tetrakis(2,4-di-tert.-butylphenyl)-4,4'-biphenylene diphosphonite;
(b) heating said blend of step (a) to a molten mass; and
(c) rapidly cooling said molten mass to about room temperature, to thereby form a composition comprising a solid continuous phase and a solid phase dispersed in said continuous phase, wherein the continuous phase is constituted by said 2,2'-oxamido-bis(ethyl-3-(3,5-di-tert.butyl-4-hydroxyphenyl)-propionate) in amorphous form and the dispersed phase is constituted by said organic phosphate in amorphous, or crystalline, or partially amorphous and partially crystalline form, and wherein the weight ratio of said continuous phase to said dispersed phase is from 9:1 to 1:9.

* * * * *